United States Patent [19]

Takeshi et al.

[11] 3,895,684

[45] July 22, 1975

[54] ELECTRONIC SPEED CONTROL SYSTEM FOR VEHICLES

[75] Inventors: Nakane Takeshi, Okazaki; Sakakibara Naoji, Chiryu, both of Japan

[73] Assignee: Aisin Seiki Kabushiki Kaisha, Kariya, Japan

[22] Filed: Oct. 31, 1973

[21] Appl. No.: 411,186

[30] Foreign Application Priority Data
Oct. 31, 1972  Japan.............................. 47-109063

[52] U.S. Cl. ............................. 180/105 E; 123/102
[51] Int. Cl.² ........................................ B60K 31/00
[58] Field of Search .......... 180/105 E; 123/102, 108

[56] References Cited
UNITED STATES PATENTS

| | | | |
|---|---|---|---|
| 3,575,256 | 4/1971 | Jania | 180/105 E |
| 3,582,679 | 6/1971 | Carp | 180/105 E X |
| 3,612,017 | 10/1971 | Ishizaki | 123/102 |
| 3,648,798 | 3/1972 | Jania | 180/105 E |

Primary Examiner—David Schonberg
Assistant Examiner—Terrance L. Siemens
Attorney, Agent, or Firm—Berman, Bishoff & Platt

[57] ABSTRACT

An electronic vehicle speed control system compares a memorized reference signal, corresponding to a desired speed, with an actual speed signal to control a vehicle throttle. The circuit is so constructed and arranged that the throttle will be moved through a greater range, and thus with increased sensitivity, for equal variations between actual and desired speeds when the desired speed is set at a higher value than when it is set at a lower value.

3 Claims, 2 Drawing Figures

3,895,684

ELECTRONIC SPEED CONTROL SYSTEM FOR VEHICLES

BACKGROUND OF THE INVENTION

The present invention relates to an automatic speed control system for automotive vehicles, and more particularly to an improvement of an electronic speed control apparatus of a type in which a predetermined speed of the vehicle is maintained by comparing a speed signal generated in response to the sensed speed of the vehicle with a reference signal representative of the predetermined speed of the vehicle.

SUMMARY OF THE INVENTION

The main object of the invention is to provide an electronic control system wherein the vehicle throttle actuator moves the vehicle throttle through a greater opening or closing angle in response to the same difference in actual speed from desired constant speed, when the desired constant speed is set at a higher value than when it is set at a lower value.

Another object of the present invention is to provide an electronic speed control system wherein a differential amplifier is adapted to compare a speed signal proportional to actual vehicle speed with a reference signal representative of the desired or set speed of the vehicle so as to maintain the set speed, the level of amplification of the differential amplifier being changed in accordance with the set speed level.

According to the present invention briefly summarized, there is provided with an electronic speed control system which comprises a memory in the form of a capacitor to couple a speed signal proportional to actual vehicle speed to a high input impedance terminal of a high input impedance amplifier, a manual control means for storing a reference signal in the capacitor by momentarily referring the common terminal between the capacitor and the high input impedance terminal to a given voltage, and a comparison circuit for controlling the throttle of the prime engine of the vehicle in accordance with the output from the high input impedance amplifier. The comparison circuit comprises a differential amplifier including a first transistor connected at its base to the output of the high input impedance amplifier and a second transistor connected at its base to a source of electrical energy. The comparison circuit further comprises means for controlling the output of the differential amplifier with respect to the speed signal proportional to the instantaneous speed of the vehicle after the reference signal is memorized in the capacitor by actuation of the manual control means.

BRIEF DESCRIPTION OF THE DRAWINGS

Additional objects and advantages of the present invention will be more readily apparent from the following detailed description of an embodiment thereof when taken together with the accompanying drawings in which.

DESCRIPTION OF THE PREFERRED EMBODIMENT

Figure 1:
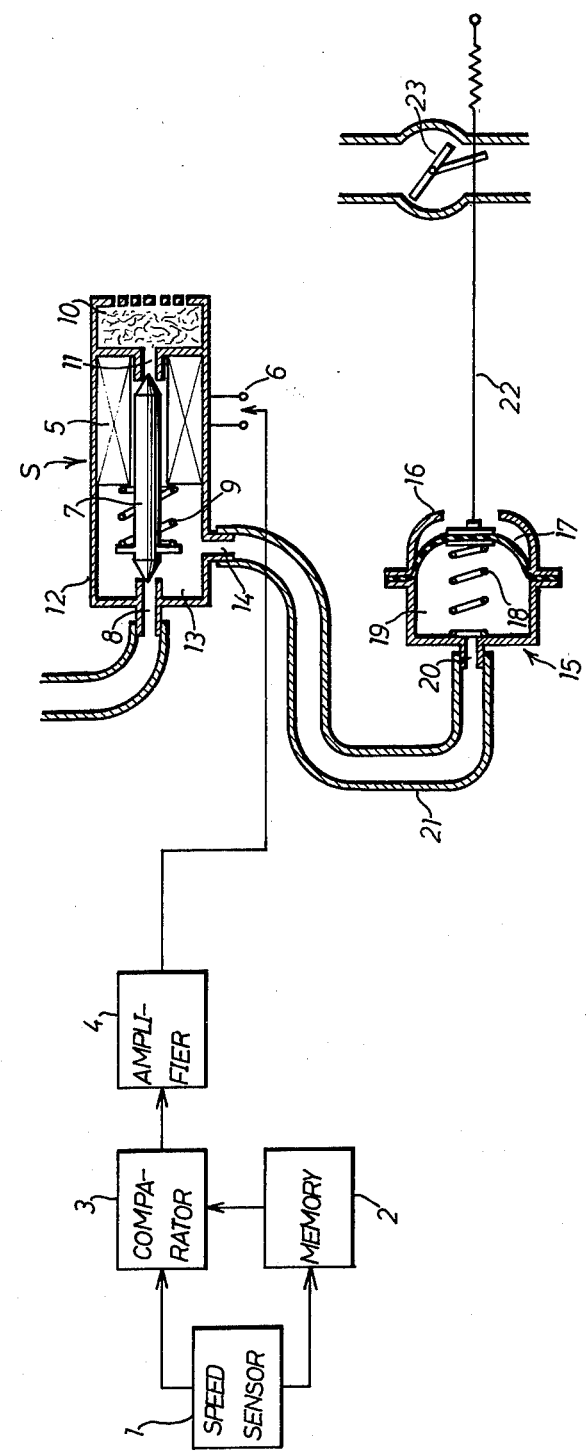
FIG. 1 is a block diagram of the electronic control circuit and the throttle valve control mechanism of an electronic speed control system in accordance with the present invention.

Referring now to FIG. 1, there is shown a block diagram of an electronic control circuit and a throttle valve control mechanism for an electronic speed control system in accordance with the present invention.

The electronic control circuit includes substantially a speed sensor 1, a memory 2, a comparator 3 and an amplifier 4; the speed sensor 1 generates a speed signal in response to travelling speed of a vehicle and the memory 2 memorizes a reference voltage responsive to a speed signal generated from the speed sensor 1 upon setting of a manual set switch for the memory 2. The comparator 3 compares the actual speed signals from the speed sensor 1 with the reference signal to generate an output voltage to be amplified by the amplifier 4 and subsequently the amplified voltage is applied to the solenoid windings 5 of a selector valve S.

The throttle valve control mechanism comprises a throttle valve 23 to control the speed of a vehicle, a vaccum servomotor 15 to actuate the throttle valve 23, and the selector valve S for selectively supplying vacuum in accordance with the amplified output signal from the amplifier 4. The selector valve S includes a housing 12 forming a chamber 13 therein, an inlet nozzle 8 to lead vacuum pressure from a vacuum source (not shown), an air nozzle 11 in open communication with the atmosphere through an air filter 10, and an outlet nozzle 14 connected with a conduit 21 extending toward the servomotor 15. The selector valve S further comprises the solenoid windings 5 having terminals 6 thereof where the output signal from the amplifier 4 is applied, a valve member 7 facing to the inlet and air nozzles 8 and 11 respectively at the both ends thereof and a coil spring 9 disposed between the solenoid windings 5 and a retainer provided on the valve member 7 to normally bias the valve member 7 leftward in the figure. Thus, while the solenoid windings 5 are deenergized, the valve member 7 closes the inlet nozzle 8 by biasing force of the spring 9 and opens the air nozzle 11. When the windings 5 are energized, the valve member 7 is attracted rightward in the figure against biasing force of the spring 9 to open the inlet nozzle 8 and close the air nozzle 11, vacuum being led into the servomotor 15 by way of the chamber 13 and the conduit 21.

The servomotor 15 comprises a casing 16 including thereon an inlet nozzle 20 connected with the conduit 21. A diaphragm piston 17 is air-tightly mounted within the casing 16 to form a pressure chamber 19. A coil spring 18 is interposed between the inner surface wall of the casing 16 and the inside of the diaphragm piston 17 to normally bias the piston rightward in the figure. The diaphragm piston 17 is at its outer surface connected operatively with the throttle valve 23 by way of a connecting link 22.

Figure 2:
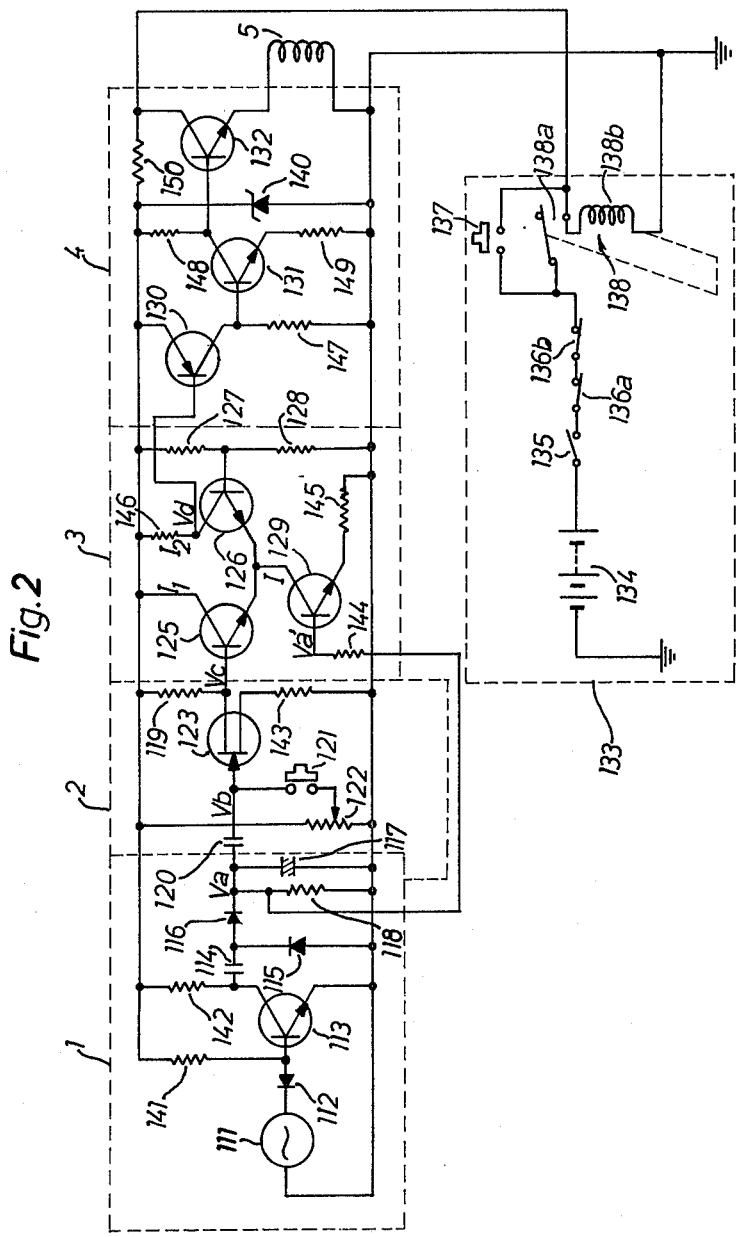
FIG. 2 depicts a complete circuit diagram of the electronic control circuit shown in FIG. 1.

FIG. 2 discloses the electronic control circuit of the speed control system discussed in reference to the block diagram of FIG. 1. The electronic control circuit includes a power source circuit 133 for controlling electric energy supply to the electronic control circuit. The power source circuit 133 comprises a car battery 134, an ignition switch 135, normally closed brake and acceleration switches 136a and 136b which open in response to the braking operation and acceleration of the vehicle respectively, and a set relay 138 whose normally open contact 138a closes by actuation of a push button switch 137 and maintains closed condition thereof by energization of a relay coil 138b.

The speed sensor of sensing circuit 1 includes a speed pickup 111 in the form of an alternating current or AC generator driven by a gear or speedmeter cable of the vehicle so as to generate alternating voltage with a frequency proportional to vehicle speed. The voltage output of the AC generator 111 is rectified by a diode 112 and induced into the base of a transistor 113 for shaping rectified voltage into square waves. The output of the transistor 113 is rectified and differentiated by a circuit comprising a capacitor 114, diodes 115 and 116 and resistor 118. Thus, a voltage of a DC level Va in proportion to the vehicle speed is charged in a capacitor 117.

The memory circuit 2 comprises a memory capacitor 120, a manual set switch 121, a variable resistor 122, a high input impedance amplifier or field resistor 119 connected to the FET 123. The variable resistor 122 is for setting a voltage Vb to be applied to the gate, or control electrode, of FET 123. Thus, upon actuation of the manual set switch 121, a reference voltage represented by Va − Vb is charged or memorized in the capacitor 120 and the voltage Vb is applied to the gate of FET 123 to generate at the drain of the FET 123 and output voltage Vc.

The comparator 3 is formed by a differential amplifying circuit comprising a transistor 125 whose base is connected to the drain of FET 123, a transistor 126 whose emitter is connected to the emitter of the transistor 125, and a voltage divider circuit composed of resistors 127 and 128. The resistors 127 and 128 are to divide the battery voltage applied to the base of the transistor 126. The comparator 3 further includes a transistor 129 as a stabilizer for the differential amplifying circuit. The collector of the transistor 129 is connected to the junction of the emitters of transistors 125 aand 126 and the base of the transistor 129 is connected to the junction of the diode 116 of the speed sensor 1 and the memory capacitor 120 through a resistor 144, whereby the voltage Va' applied at the base of the transistor 129 is related to the voltage Va charged in the capacitor 117 of the speed sensor 1. In this comparator 3, when an output voltage of the collector of the transistor 126 is represented by character Vd, currents represented by I, $I_1$, and $I_2$ appear respectively at the collector of the transistor 129, the collector of the transistor 125 and the collector of the transistor 126 and the voltages Va', Vc and Vd appear respectively at the base of the transistor 129, the base of the transistor 125 and the collector of the transistor 126. The formula $I = I_1 + I_2$ always applies in comparator 3 of change of the voltage Va' appearing at the base of the transistor 129.

The amplifier circuit 4 comprises a transistor 130 whose base receives the output voltage Vd from the comparator 3 and whose collector is connected to the base of a transistor 131. The amplifier 4 further comprises a transistor 132 whose base is connected to the collector of the transistor 131 and whose emitter is connected to the solenoid windings 5 of the selector valve S described previously in reference to FIG. 1. A zener diode 140 is provided within the amplifier 4 for stabilizing the voltage from the power source circuit 133 at a constant voltage value.

The operation of the electronic speed control system will be described hereinafter in detail. The control system can be conditioned to its operable state by closing the main switch 137 of a push button type while the vehicle is travelling with the ignition switch 135 closed. Then, the contact 138a of the set relay 138 is closed to supply the battery energy to the electronic circuit.

The variable resistor 122 is set for a given voltage Vb which is defined in accordance with the power of the prime engine and is thus predetermined for the best vehicle-speed controlling operation. When the vehicle is driven and reaches a desired constant cruising speed the manual set switch 121 is actuated to charge a voltage Va − Vb in the memory capacitor 120 so that a reference voltage proportional to the desired speed of the vehicle is memorized within the memory circuit 2.

When the speed of the vehicle exceeds the desired or set speed, the generator 111 of the speed sensor 1 generates a voltage with frequency proportional to the increased speed of the vehicle. Then, considering Va as the initial voltage, a voltage Va + X is charged within the capacitor 117, the character X representing the magnitude of the voltage proportional to the increased speed. Va − Vb represents the voltage charged within the memory capacitor 120. When the voltage Va is increased to be Va + X, the voltage Vb is subsequently increased to be Vb + X. This applies an increased voltage Vb + X to the gate of the FET 123, which turns the FET 123 to a higher conductive state. As a result, the output voltage Vc of the memory 2, which appears at the drain of the FET 123, becomes smaller.

Now in the comparator 3, the transistor 125 receives at its base a smaller output voltage from the memory 2, which turns the transistor 125 to a less-conductive state. Then, through the function of the comparator 3 as mentioned previously, the current $I_2$ increases to decrease the output voltage to be applied to the base of the transistor 130 of the amplifying circuit 4. Consequently, the transistor 130 turns to a more-conductive state to generate its output of a larger value. The output of transistor 130 appears at the base of the transistor 131 and subsequently, the transistor 132 is conditioned to a less-conductive state to supply a smaller output to the solenoid windings 5 of the selector valve S. Thus, in the throttle valve control mechanism, in accordance with the decrease of the output from the amplifier 4, the attracting force acting on the valve member 7 by the solenoid windings 5 is decreased to gradually open the air nozzle 11 and close the inlet nozzle 8. This fills the chamber 13 of the selector valve S with atmospheric air through the air nozzle 11. The atmospheric air supplied into the chamber 13 is led into the pressure chamber 19 of the servomotor 15 through the conduit 21 to move the diaphragm piston 17 rightward in the figure aided by the biasing force of the spring 18. Consequently, the throttle valve 23 is partly closed through the connecting link 22 to decrease the speed of the vehicle.

When the actual speed of the vehicle decreases below the preset speed, the control circuit functions to produce an entirely opposite result to the operation described above. Consequently, the solenoid windings 5 of the selector valve S is energized and the valve member 7 is displaced rightward in the figure against biasing force of the spring 9. The displaced valve member 7 opens further the vacuum nozzle 8 and closes the air nozzle 11 so that the vacuum is led into the chamber 13. Thus, the vacuum is supplied into the pressure chamber 19 of the servomotor 15 by way of the conduit 21. The diaphragm piston 17 is then moved leftward in the figure against biasing force of the spring 18 to partly open the throttle valve 23 by way of the connecting link 22 to increase the speed of the vehicle.

During the above described control operation, when the desired constant cruising speed of the vehicle is set by closing switch 121 at the tiime when the actual vehicle speed is high, the voltage Va' applied to the base of the transistor 129 is larger being responsive to the output voltage Va from the speed sensor 1, than when the desired cruising speed is set at a lower value, so as to increase the current I appearing at the collector of the transistor 129. Under this state, as long as the formula $I = I_1 + I_2$ is satisfied, the changing rate of the current $I_2$ at the collector of the transistor 126 becomes larger. On the other hand, when the speed of the vehicle is controlled at a low speed, the voltage Va' appearing at the base of the transistor 129 becomes smaller to decrease a current I. This causes the decrease of the changing rate of the current $I_2$.

In other words, when the reference voltage Va — Vb memorized in the memory circuit 2 is set at a high figure, the output of the comparator 3 is regulated in a wider range and is more sensitive to a given variation from the set speed. When the refernece voltage Va — Vb is set at a low figure, the output of the comparator 3 is regulated in a narrower range and is less sensitive to variations from the set speed. Consequently, the opening or closing angle of the throttle valve 23 by the operation of the disclosed control system is larger when the speed of the vehicle is controlled at a high set speed than when the speed of the vehicle is controlled at a low preset speed.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. An electronic control system for use in automatically controlling speed of a vehicle, comprising an actuator for a throttle valve of the vehicle;
   means for generating a speed signal proportional to the vehicle speed;
   a memory circuit including a capacitor, a high input impedance amplifier having a control electrode and an output terminal, one of the terminals of said capacitor being connected to said speed signal generating means and the other terminal of said capacitor being connected to the control electrode of said high input impedance amplifier;
   a manual control variable means for storing a reference signal in said capacitor connected to the junction between the control electrode of said high input impedance amplifier and said capacitor;
   a comparison circuit connected to said memory circuit for operating said throttle valve actuator in accordance with the output of said high input impedance amplifier; in said comparison circuit including
   a differential amplifier having conncted first and second transistors, said first transistor being connected at its base to the output terminal of said high input impedance amplifier, said second transistor having a terminal forming the output of said differential amplifier and being connected at its base to a source of electrical energy, and means for controlling the output of said differential amplifier with respect to changes in said speed signal applied thereto after said reference signal is memorized in said memory circuit by actuation of said manual control means;
   said means for controlling the output of said differential amplifier including a third transistor whose base is connected to the output of said means for generating a speed signal and whose collector is connected to the junction of the emitters of said first and second transistors.

2. An electronic circuit system as set forth in claim 1, wherein said high input impedance amplifier is a field effect transistor whose gate is connected to said capacitor and whose output terminal is connected to the base of said first transistor.

3. An electronic control system as set forth in claim 1, wherein said manual control variable means for storing a reference signal comprises a second capacitor connected between ground and said one terminal of the first capacitor, a resistor connector between ground and a source of electric potential, a manually movable contact arm in sliding engagement with said resistor and a manual switch connected between said contact arm and said other terminal of said first capacitor.

* * * * *